United States Patent [19]

Irwin

[11] 4,135,249
[45] Jan. 16, 1979

[54] SIGNED DOUBLE PRECISION MULTIPLICATION LOGIC

[75] Inventor: John M. Irwin, Clay, N.Y.

[73] Assignee: General Electric Company, Syracuse, N.Y.

[21] Appl. No.: 811,193

[22] Filed: Jun. 29, 1977

[51] Int. Cl.² .............................................. G06F 2/52
[52] U.S. Cl. ................................................. 364/758
[58] Field of Search .............................. 364/757, 758

[56] References Cited

U.S. PATENT DOCUMENTS

| | | | |
|---|---|---|---|
| 3,407,290 | 10/1968 | Atrubin | 364/758 |
| 3,795,880 | 3/1974 | Singh et al. | 364/758 |
| 3,947,670 | 3/1976 | Irwin et al. | 364/758 |

Primary Examiner—Jerry Smith
Attorney, Agent, or Firm—Richard V. Lang; Carl W. Baker; Frank L. Neuhauser

[57] ABSTRACT

The present invention relates to a multiplication logic for signed multiplication of two numbers to obtain a double precision product in two's complement notation, each quantity being in serial form with the least significant bit first. The multiplier may be in either two's complement, sign magnitude, or unsigned notation, and the multiplicand in two's complement notation. With adjustment of a timing waveform, the multiplication logic will accommodate multiplicands of any word length and also various multiplier word lengths below a design maximum. With shorter multipliers, separate provisions are made for entry of the sign. The logic contains integrated timing responsive to the externally supplied timing waveform, a measure which simplifies application as operands are varied. The multiplication logic is suitable for use in a large number of digital applications including digital filters, correlation, convolution, squaring and polynomial evaluation. In addition to flexibility in the use of a given logic, repetitive cellular design permits larger or smaller logics to be readily produced. The design is suitable for large scale integration.

12 Claims, 5 Drawing Figures

SIGNED DOUBLE PRECISION MULTIPLICATION LOGIC

BACKGROUND OF THE INVENTION

1. Field of the Invention

The present invention relates to the field of digital computation and more particularly to sequential logic used to multiply two serial numbers to obtain a serial output, the product being of double precision and reflecting the sign of the operands. The invention is particularly adapted to fabrication using large scale integration.

2. Description of the Prior Art

Multiplication of two binary numbers of m and n bits respectively, if there is no truncation, leads to a product of (m + n) bits, conventionally referred to as a double precision product. When lower accuracy is acceptable, typically comparable to that of the operands, the double precision product is truncated, possibly in formation of the individual partial products. If double precision is sought, that precision must be preserved in the formation of the individual partial products. The double precision product is often required in high precision arithmetic, such as integration.

The present invention represents an outgrowth of earlier work described in U.S. Pat. No. 3,947,670 of John M. Irwin et al, entitled "Signed Multiplication Logic". The patent describes a multiplication logic obtaining a single precision product. The partial product stages described therein form truncated partial products, suitable for formation of a single precision product.

SUMMARY OF THE INVENTION

Accordingly, it is an object of the present invention to provide an improved serial multiplication apparatus appropriate for integrated circuit fabrication.

It is a further object of the invention to provide a serial multiplication apparatus that generates double precision products.

It is another object of the present invention to provide an improved serial multiplication apparatus for double precision multiplication wherein zero, one or both of the operands are signed.

It is an additional object of the present invention to provide an improved serial multiplication apparatus for double precision four quadrant multiplication.

It is a further object of the present invention to provide an improved serial multiplication apparatus that generates double precision four quadrant products in two's complement notation.

It is still another object of the present invention to provide a serial multiplication apparatus for double precision products in which the multiplier and multiplicand inputs are interchangeable when their word lengths and notation are alike.

It is yet another object of the present invention to provide an improved serial multiplication apparatus which is capable of use with variable length operands.

It is another object of the present invention to provide an improved serial multiplication apparatus for signed double precision multiplication and adaptable for one operand in two's complement notation or in sign magnitude notation.

These and other objects of the invention are achieved in a novel apparatus for signed multiplication of two numbers to obtain a double precision product in two's complement notation, each quantity being in serial form with the least significant bit first. The multiplier may be in either two's complement, sign magnitude or unsigned notation and the multiplicand in two's complement notation. The multiplicand may be of any word length while the multiplier should not exceed a maximum length established by the electrical design. The apparatus comprises three registers, a plurality of partial product selectors and a summation network.

The three registers comprise a multiplier register, each output tap of which selects and stores a successively later multiplier bit, a multiplicand register for supplying successively shifted multiplicands, and a timing register for supplying successively shifted timing or "word marker" waveforms. The timing waveform has a first portion whose duration is set equal to "m" bit times of an "m" bit multiplicand and having a second alternate portion set equal to the "n" bit times of a multiplier word.

The plurality of partial product selectors form separate double precision partial products under the control of four input connections. One input connection is to the tap on the multiplier register for response to the "$i^{th}$" multiplier bit. The second input connection is to the multiplicand shift register for entry of the $i^{th}$ multiplicand, delayed in correspondence with the significance of the multiplier bit entered. The third input connection is to an output tap on the timing waveform shift register for application of a delayed timing waveform ($t_i$) having its first portion delayed to coincide with the $i^{th}$ multiplicand. The fourth and last input connection is to a source of the timing waveform at reference time ($t_r$) for defining the bit time limits of the double precision partial product word.

Responding to these inputs, the partial product selector produces a partial product between the bit time limits which consists of the shifted $i^{th}$ multiplicand gated by the $i^{th}$ multiplier bit, preceded by zero or more zeros and succeeded by one or more repetitions of the last or sign bit.

The multiplication logic is completed by the summation network to which all the partial products are coupled and which consolidates the bit streams representing the sign extended double precision partial products into a single bit stream to form a double precision product of m + n bits.

In a practical form, the partial product selector comprises a first means responsive to the first three inputs for generating a shifted multiplicand during the first portion of the delayed timing waveform ($t_i$), if the multiplier bit is a "1" and a zero output under other conditions; a second means responsive to the third ($t_i$) and fourth ($t_r$) inputs and the last bit of the shifted multiplicand for repeating the last multiplicand bit if it is a "1" until the last bit of the product; and a third means responsive to the outputs of the first and second means to produce a partial product of (m + n) duration.

More particularly, the first means is a three input gate simultaneously responsive to the three inputs thereto, the second means is a three input gate simultaneously responsive to the three inputs thereto, and the third means is a two input gate responsive to one or the other input thereto. In a P-channel MOS integration process the first means is a three input NAND gate, the second means comprises a three input NAND gate and the third means is a two input NAND gate.

The apparatus is capable of four quadrant multiplication when the multiplicand and multiplier are in two's complement notation and a partial product selector is provided for each bit of a multiplier word. To complete the summation, the output of the last partial product selected is subtractively combined in the summation network.

Four quadrant multiplication is also performed when the multiplicand is in two's complement notation and the multiplier bit is in sign magnitude notation and the number of partial product selectors equals or exceeds the number of bits per multiplier word (the higher order multiplier bits are zeroed, if the number of partial product selectors exceeds the multiplier bit number). All partial products are then combined in the summation network. The sign bit of the multiplier is separately applied to the summation network to control the sign of the product. Two quadrant multiplication is performed when the multiplicand is in two's complement notation and the multiplier is in unsigned notation.

The apparatus may be used for squaring an operand if the "m" bit times of the first portion of said timing waveform is set equal to the "n" bit times of said second portion, and the operand is applied to both the multiplier and the multiplicand registers simultaneously.

In manufacture, a stage of the multiplier register, a stage of the multiplicand register, a stage of the timing register, and a partial product selector are intimately associated to form a repetitive unit of similar circuit content, each stage of the three registers and the partial product selector in the repetitive unit being electrically connected to produce a single partial product for application to the summation network. In this manner, each partial product stage may be formed as a repetitive cellular unit in an integrated circuit process. A suitable integrated circuit process is a P-channel MOS process using gates which are principally minimum geometry NAND gates.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

DESCRIPTION OF THE PREFERRED EMBODIMENTS

Figure 1:
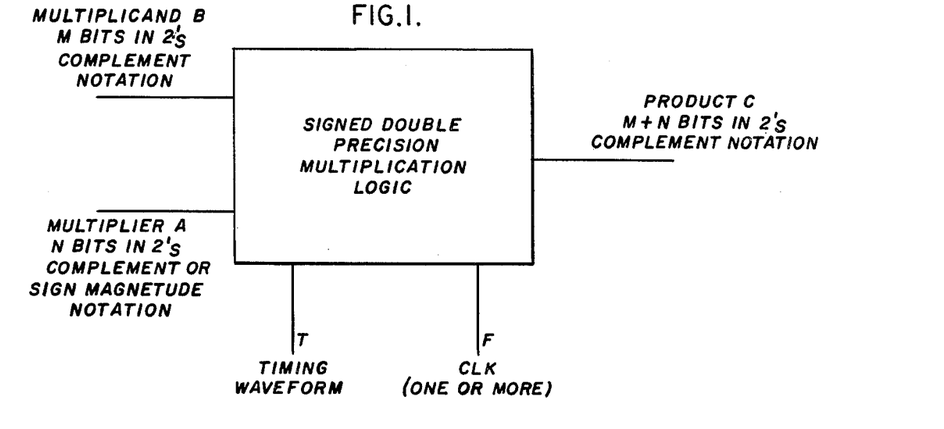
FIG. 1 is a block representation of a signed four quadrant double precision multiplication logic showing the interface terminals, including those for the multiplicand, multiplier, product, timing waveform and clocking.

Referring now to FIG. 1, the signed four quadrant double precision multiplication logic is a single block to which five interface terminals are shown. They include the multiplicand input marked "B", the multiplier input marked "A", and the product output marked "C". The multiplicand is of m bits, but as will be seen, assuming appropriate adjustment of the timing waveform, it may be of any desired number of bits in length. The multiplier is of n bits, which as will be seen, corresponds to the number of partial product stages, although a multiplier of fewer bits may be accommodated. The product output is of m plus n bits, including a redundant sign bit. The interface quantities A, B and C are serial, typically in two's complement notation with the least significant bit first in time and the sign bit last. Two quadrant operation is achieved for the case where the multiplier is unsigned. Also, the multiplier may be in sign magnitude form, with minor accommodation. The timing waveform (T) is a repetitive waveform which has two intervals, one low and the other a high interval. The high interval is set equal to the m bits of the multiplicand. The low interval is set equal to the length of the multiplier. The duration of the two portions (m + n bits) is the duration of one cycle of the timing waveform. Clocking, which may be two non-overlapping phases for MOS-FET implementation, is applied to the interface terminal(s) marked "F".

As will be explained in more detail in the following figures, the product C is formed by the summation of a plurality of partial products. Each of the input quantities A, B and T are applied to separate registers, which distribute these quantities to a plurality of partial product selectors in each of which a partial product is formed.

Figure 2:
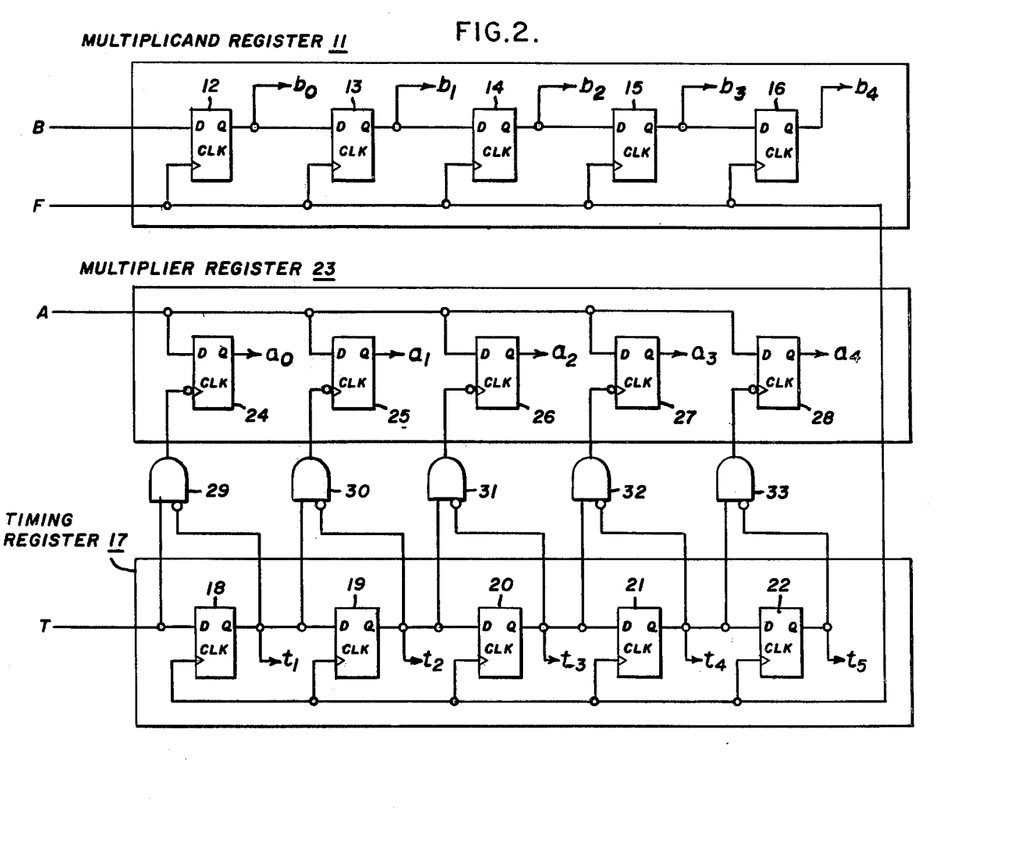
FIG. 2 is a diagram of the registers for the multiplicand, multiplier and the timing waveform of the muliplication logic, assuming a five bit multiplier.
Figure 4:
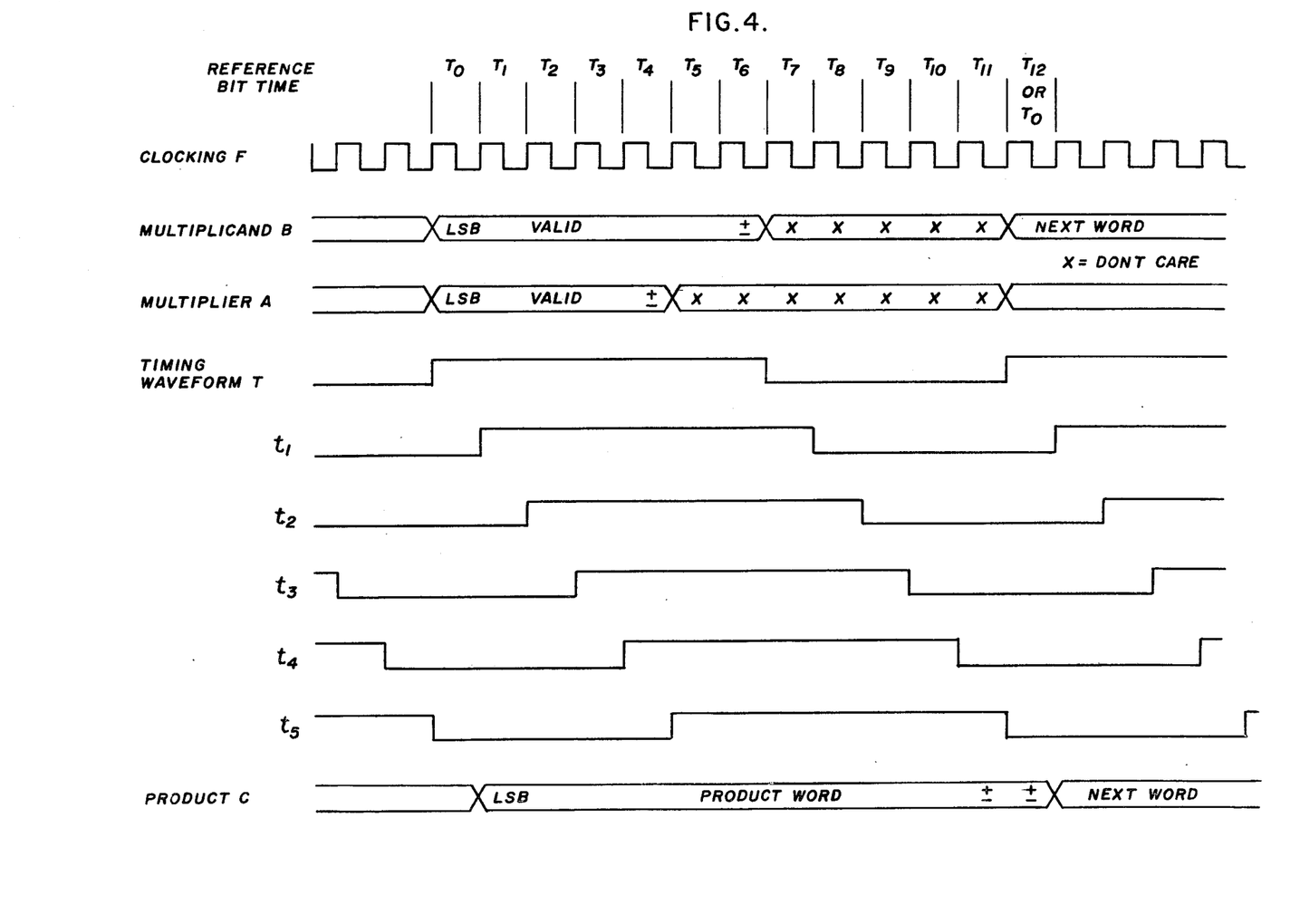
FIG. 4 is a timing diagram of the multiplication logic of FIG. 3, including the multiplicand, multiplier, product, timing waveforms and clocking, assuming a seven bit multiplicand and a five bit multiplier.

The multiplicand, multiplier, and timing registers of the multiplication logic are shown in FIG. 2, while the relevant timing waveforms are shown in FIG. 4. All waveforms in FIG. 4 are plotted against a common reference time, measured in 12 bit intervals at 12 bits per word, and noted as ($T_0, T_1, T_2, \ldots T_{11}$). Plotted beneath the time is the clocking, at one cycle per bit. Typically, two phase clocking is used, in which event the second clock is of opposite phase to the first clock and non-overlapping. The timing of the multiplicand is depicted at "B" in FIG. 4. It consists of the seven bits from time $T_0$ through $T_6$, showing when the multiplicand is valid, followed by five bit times $T_7$ through $T_{11}$, which are in turn followed by the next multiplicand word. Reading from left to right, the least significant bit of the multiplicand is first (at $T_0$) and the sign bit is the last bit (at $T_6$) to the right. Each multiplicand bit may assume a zero or a one condition during the seven bit interval ($T_0$-$T_6$). Assuming, for reasons that will be explained, that the timing waveform is of proper length, the five remaining bits (at time $T_7$-$T_{11}$), spaced between the end of the present multiplicand word and the beginning of the next word, are interpreted as "don't care" inputs. They are not utilized in further processing of the multiplicand and have no effect.

The multiplicand (B), which has just been described, is applied to the multiplicand register 11 shown in FIG. 2 for eventual distribution to the partial product selectors.

The multiplicand register consists of five delay flip-flops (12-16) each having a one bit delay, which makes them suitable for cascaded connection into the indicated shift register configuration. Each delay flip-flop (12 through 16) is a three terminal device having a D input for application of the multiplicand, a clocking input, and a Q output for derivation of a multiplicand delayed one bit. As symbolized, the delay flip-flops operate on the rising edge of the clocking pulse. The output of the first flip-flop 12 provides a multiplicand delayed one bit and labelled $b_0$; the second (13) a multiplicand labelled $b_1$; the third (14), a multiplicand labelled $b_2$; the fourth (15) a multiplicand labelled $b_3$; and finally, the fifth (16), a multiplicand labelled $b_4$. Each of the successive multiplicands $b_0$ through $b_4$ are delayed one bit later (to the right in FIG. 4) and are applied to the respective multiplicand inputs $b_0$–$b_4$ of the partial product selectors of the multiplication logic shown in FIG. 3. A delay flip-flop which may serve as the logical model for this application is the SN7474 (Texas Instruments).

The timing waveform is the waveform marked "T" in the timing diagram of FIG. 4. It is used in subsequent portions of the multiplication logic to mark the "valid" portions of the multiplicand, to select appropriate bits of the multiplier, to treat the sign bits, and to bound the product word. It is the principal means for achieving integrated timing. It consists of a first, high portion of seven bit times, set equal to the number of multiplicand bits, and a second low portion of five bit times, set equal to the number of multiplier bits. The timing waveform is repetitive, having a twelve bit duration set equal to the duration of the full product word. As shown, the timing waveform T commences at time $T_0$, terminates at the end of the twelfth bit and changes from the first to the second condition at time $T_7$.

The timing waveform T, which has just been described, is applied to the timing waveform register 17 for distribution to the partial product selectors.

The timing register 17, which is similar to the multiplicand register, consists of five delay flip-flops (18–22) each having a one bit delay which makes them suitable for cascaded connection into a shift register configuration. Each delay flip-flop (18–22) is a three terminal device having a D input for application of the timing waveform, a clocking input, and a Q output for derivation of the timing waveform delayed one bit. As symbolized, the delay flip-flops (18–22) operate on the rising edge of the clocking pulse. The timing waveform (T) is applied to the D input of the first flip-flop 18. The flip-flop 18 then produces the waveform $t_1$, delayed one bit from waveform T. The waveform $t_1$ is applied to the D input of the second flip-flop 17. The timing waveform $t_2$, which appears at the Q output of flip-flop 19, is delayed one bit from $t_1$. The waveform $t_2$ is coupled to the D input of flip-flop 20. The timing waveform $t_3$, which appears at the Q output of the flip-flop 20, is delayed one bit from $t_2$. The waveform $t_3$ is coupled to the input of flip-flop 21. The timing waveforms $t_4$ and $t_5$ are similarly generated in flip-flops 21 and 22 and similarly delayed. These waveforms are displaced one bit time to the right as one proceeds successively from the original timing waveform (T) to the final waveform ($t_5$). The waveforms are shown in FIG. 4 adjacent the legends T, $t_1$ to $t_5$. The timing waveforms derived in the timing register 17 are applied to the respective partial product selectors of the multiplication logic of FIG. 3.

The timing of the multiplier is depicted at "A" of FIG. 4. It consists of the five bits from time $T_0$ through $T_4$, showing when the multiplicand is valid, followed by seven bits from time $T_5$ through $T_{11}$, which are in turn followed by the next multiplier word. As with the multiplicand reading from left to right, the least significant bit of the multiplier is first (at $T_0$) and the sign bit is the last bit (at $T_4$) to the right. Each multiplier bit may assume a zero or a one condition during the five bit interval ($T_0$ to $T_4$). Assuming that the timing waveform T is of proper length, the remaining seven bits of time ($T_5$ to $T_{11}$) spaced between the end of the present multiplier word and the beginning of the next word, are interpreted as "don't care" inputs. They are not utilized in further processing of the multiplier and have no effect.

The multiplier which has just been described is applied to the multiplier register 23, shown in FIG. 2, for eventual distribution to the partial product selectors. The multiplier bit register 23 consists of a succession of flip-flops 24 to 28, which derive their timing information from the timing register 17 previously discussed via a succession of AND gates 29 to 33. Each flip-flop 24 through 28 is a three terminal device having a D input for application of the multiplier bit stream from the multiplier bus, and a Q output for derivation of a selected multiplier bit from the bit stream. Each flip-flop has a clocking input which responds to the falling edge of a control pulse, as denoted by the dynamic indicator (>) together with the inversion symbol (o) drawn at the clocking input. The clocking input of each multiplier flip-flop (24 through 28) is coupled to the output of an associated AND gate (29 through 33). Each AND gate is a two input device with one input requiring an inverted logic level. The non-inverted input of AND gate 29 is coupled to the D input of the timing flip-flop 18 to which the timing waveform "T" is applied. The inverted input of AND gate 29 is coupled to the Q output of the timing flip-flop 18 at which the delayed waveform $t_1$ appears. The effect of these input connections to AND gate 29 is to produce an output pulse from AND gate 29 which rises to a "1" when the timing waveform (T) has changed from a low to a high condition and the delayed timing waveform ($t_1$) is still in a low condition. The output pulse from the AND gate 29 falls when the waveform ($t_1$) goes to a high condition, and in falling causes the flip-flop 24 to sample the multiplier bit stream during the least significant bit time on the multiplier bus 34. Thus, the flip-flop 24 which responds to the falling edge of the clocking pulse from AND gate 29, selects the least significant multiplier bit. The selected bit appears at the $a_o$ output of the flip-flop 24 where it remains until a subsequent pulse is applied to the clocking pulse input at the least significant bit of the next word.

Similarly, the flip-flop 25 acting in conjunction with the AND gate 30 and responding to waveforms $t_1$ and $t_2$ from the timing register 17, selects and holds the second multiplier bit (counting from the least significant bit). The third flip-flop 26, operating in conjunction with the AND gate 31, and responding to waveforms $t_2$ and $t_3$ from the timing register, selects and holds the third multiplier bit. The fourth flip-flop 27 operating in conjunction with the AND gate 32 and responding to waveforms $t_3$ and $t_4$ from the timing register, selects and holds the fourth multiplier bit. The last multiplier bit, the sign bit, is selected and held by the last flip-flop 28 operating in conjunction with the AND gate 33 and responding to waveforms $t_4$ and $t_5$ from the timing register.

Figure 3:
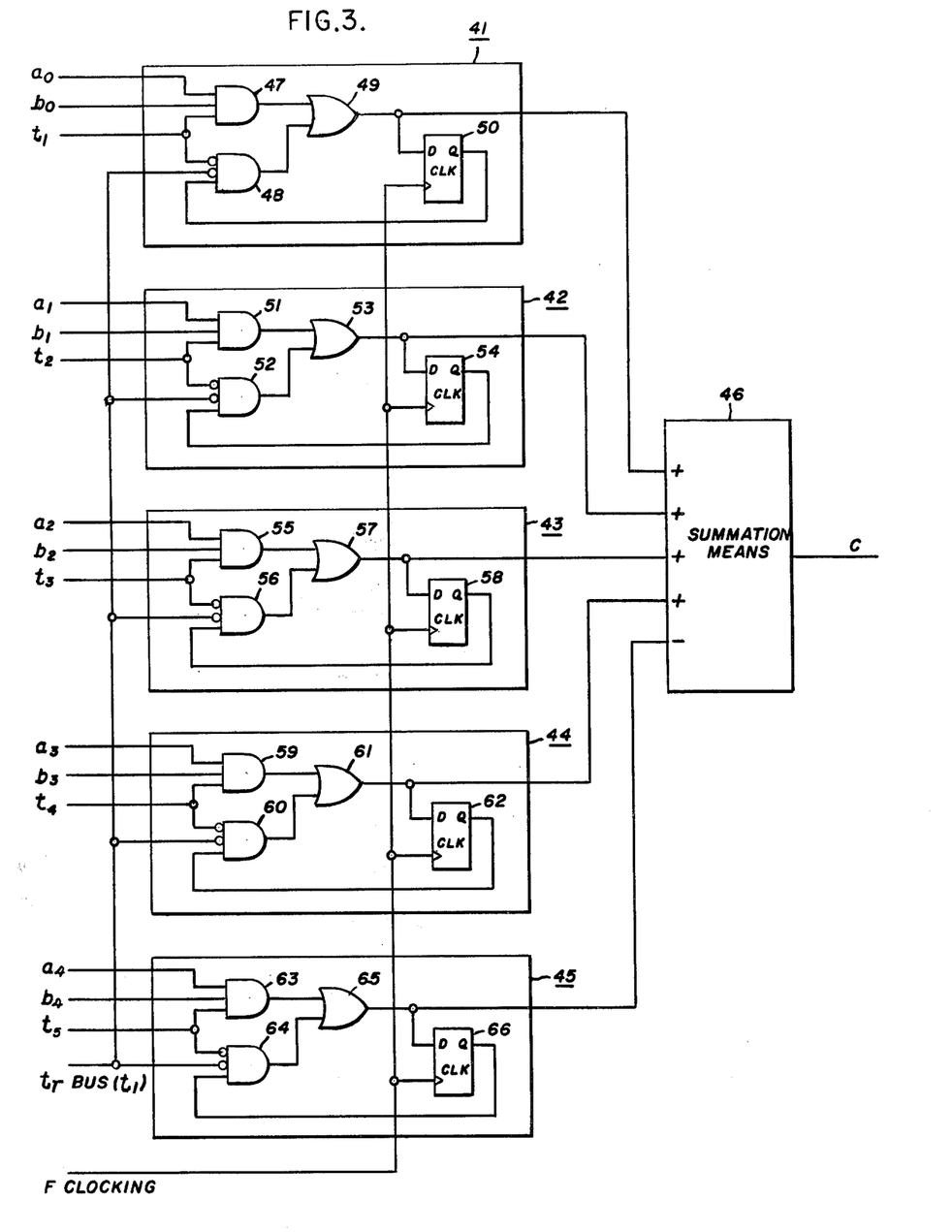
FIG. 3 is a diagram of the partial product selection and summation means of the multiplication logic.

The three registers (11, 23 and 17) and AND gates 29 to 33 just discussed provide multiplicand, multiplier and word length inputs required for the partial product selectors illustrated in FIG. 3. The partial product selectors 41-45 form the partial products which when added in the summation means 46, also illustrated in FIG. 3, produce the full precision product (C). Each partial product selector comprises two three input AND gates, an OR gate, and a one bit delay. The delay may be modeled as a D flip-flop.

The first partial product selector 41 consists of AND gate 47, AND gate 48, OR gate 49 and one bit delay 50, which are interconnected as follows. The first AND gate 47 has three inputs coupled to the $a_o$ output of the multiplier register 23, the $b_o$ output of the multiplicand register 11, and the $t_1$ output of the timing register 17, respectively. The second AND gate 48 has three inputs, two requiring an inverted logic level. The $t_1$ output of the timing register 17 is coupled to the first inverted input of the AND gate 48. The timing waveform $t_1$ supplied on a bused connection to all partial product selectors is also applied to the second inverted input of AND gate 48. The outputs of AND gates 47 and 48 are coupled to the two inputs of OR gate 49. The output of OR gate 49 is coupled to a first additive input of the summation means 46 and to the D input of a delay flip-flop 50. The flip-flop 50 is also coupled to the clock (F). The flip-flop 50 delivers a pulse from output Q after a one bit delay to the non-inverted third input of the AND gate 48.

In the interests of integrated timing and ease in laying out a multiplication logic having other multiplier word lengths than the one herein described, each partial product selector is preferably formed in a single repetitive cell using a known integrated circuit fabrication technique. Each cell contains a partial product selector, a stage of each of the multiplicand, multiplier and timing registers and an AND gate (29 to 33). The timing register may also be used to produce timing information used to reset stored carries of summers in the summation means. The integration of the registers and AND gates with the partial product selectors into a common cell integrates the timing with the circuitry which requires it, and greatly simplifies the use of the resulting multiplication logic in larger digital systems. The elements of a single cell define a partial product "stage" of the multiplicand logic.

The operation of the partial product selector in forming a partial product may be explained with reference to FIGS. 3 and 4. FIG. 4 contains respectively the clocking waveform (F), the multiplicand bit stream (marked B), the multiplier bit stream (marked A), the timing waveform (marked T), and the respective outputs of the timing register (marked $t_1$, $t_2$, $t_3$, $t_4$ and $t_5$). The shifted multiplicand of the first partial product (PP1), produced by the first partial product selector 41, is bounded by the timing waveform $t_1$. The shifted multiplicand of the second partial product (PP2), and shifted multiplicands of the successive partial products (PP3, PP4 and PP5) are bounded by the successive timing waveforms $t_2$, $t_3$, $t_4$ and $t_5$. When added simultaneously via the summation means, assuming that the summation means introduces no additional delay, the partial products produce the product word with a LSB commencing at time $T_1$ and ending in a double sign bit 12 bits later, as shown at C in FIG. 4. Formation of the partial product will now be described.

During the first portion of the timing waveform ($t_1$), the first partial product selector 41 generates the magnitude bits and one sign bit in two's complement notation of the first partial product (PP1) corresponding to the multiplicand (assuming a "1" multiplier bit). As previously noted, the partial product selector 41 has supplied thereto the least significant bit $a_o$ of the multiplier, the multiplicand delayed one bit ($b_o$), and the timing waveform delayed one bit ($t_1$). In the normal flow of time, the timing waveform ($t_1$) applied to the AND gate 47 remains in a low condition until the first bit of the product word at time $T_1$. At this point the timing waveform $t_1$ becomes high. Thus, during the first bit ($T_1$), the least significant bit $a_o$ of the multiplier and the first bit of the multiplicand $b_o$ are applied to the input of the AND gate 47. With the timing waveform high, and assuming both $a_o$ and the first bit of $b_o$ are 1's, during the first bit time ($T_1$) the AND input condition of gate 47 is satisfied and a "1" for the first bit of the partial product appears at the output of AND gate 47. Since the OR gate 49 responds to a "1" from either the output of AND gate 47 or 48, the OR gate couples the first 1 in the partial product to the first additive terminal of the summation means 46. (The "1" which has just appeared at the output of OR gate 49 is also coupled to the D input of the delay flip-flop 50. The "1" is not regenerated because the AND gate 48 is held in an "off" condition by timing waveform $t_1$ now in a high state at both input terminals requiring an inverted logic level.) Should the second bit of the multiplicand also be a 1, the process is repeated and a second 1 is coupled via the OR gate 49 to the first input terminal of the summation means 46 during the second bit time ($T_2$). Should the third bit of the multiplicand be a 0, a 0 output is coupled to the summation means 46 at the third bit time ($T_3$). Assuming a multiplier bit of 1, each successive bit of the multiplicand from the LSB to the sign bit is coupled to the first input terminal of the summation means 46 during the bit times $T_1$ to $T_7$. Had the first multiplier bit been a 0, then a succession of 0's would have been coupled from the partial product selector 41 to the summation means 46. When the last bit of the multiplicand $b_o$ passes, the timing waveform $t_1$, whose high condition is set equal to the length of the multiplicand, now ends and the timing waveform $t_1$ reverts to a low condition. This prevents any further output from the AND gate 47.

During the second portion of the timing waveform $t_1$, the first partial product selector generates the sign extension of the first partial product (PP1). As the last, or sign bit is passing through OR gate 49, it is delayed one bit in the flip-flop 50, and now appears at the non-inverted input of AND gate 48. If the sign bit is a "1" at the beginning of the eighth bit time ($T_8$), the waveform $t_1$, applied to both inverted inputs, is low, and the AND input conditions for a "1" output from gate 48 are met. A "1" at the output of the AND gate 48, which is coupled to the input of OR gate 49, produces a "1" output from OR gate 49. The "1" output from OR gate 49 is coupled to the summation means 46. In addition, the OR gate output after a 1 bit delay is reapplied via AND gate 48 to the input of the OR gate in a manner to cause a repetition of the "1" bit so long as the timing waveform $t_1$ is in a low state. Since the timing waveform $t_1$ continues in the low state to the last bit of the product word, extension of the "1" sign bit also continues to the last bit time ($T_{12}$). Had the sign bit been a "0", the OR gate 49 would have remained in a "0" state until the last bit time ($T_{12}$). In the foregoing manner, the first partial product (PP1) is terminated with sign extension continuing to the last bit of the product word (bit time $T_{12}$).

The first partial product PP1 is formed by operation of the multiplicand in response to the least significant multiplier bit ($a_o$). Accordingly, the first partial product PP1 contains the least delayed (1 bit) multiplicand. In other words, the shifted multiplicand in the first partial product enters the summation means first, weighted according to the multiplier bit position. This is consistent with the fact that the partial product PP1 is the least significant partial product. The subsequent partial products increase in significance by one bit steps.

The second, third and fourth partial product selectors 42, 43 and 44 function similarly to selector 41 in producing the second, third and fourth partial products (PP2, PP3 and PP4) of successively higher significance. Both the timing waveform $t_1$, delayed one bit with respect to T, and a selectively delayed timing waveform (delayed 2, 3 or 4 bit times with respect to T) are applied to these partial product selectors. In the second partial product selector 42, a bit time $T_1$, the timing waveform $t_1$ is high, but the timing waveform $t_2$ remains low. AND gate 51 produces a 0 since $t_2$ is low and AND gate 52 produces a 0 since $t_1$ remains high. Consequently, the OR gate 53 produces a "0" at bit time $T_1$ for the first term of the second partial product. At bit times $T_2$ and $T_8$, the waveform $t_2$ is high and the shifted multiplicand delayed two bits to coincide with the timing waveform $t_2$, is replicated in the second partial product (assuming that the second multiplier bit ($a_1$) is a "1"). When the waveform $t_2$ falls to a low state, AND gate 51 goes to a "0", and sign extension initiates. At bit time $T_{12}$, waveform $t_1$ goes to a high condition, and sign extension stops at the partial product boundary. In the third partial product selector 43, a similar process occurs, and a partial product is formed between bit times $T_1$ and $T_{12}$, which commences at bit time $T_1$ with two "0's", includes seven bits of shifted multiplicand from bit times $T_3$ through $T_9$ (if the third multiplier bit is a "1"), and terminates with sign extension from bits $T_{10}$ through $T_{12}$. Similarly, the fourth partial product selector 44 produces a partial product PP4, commencing a bit time $T_1$ with three "0's", includes the shifted multiplicand (if the multiplier bit is a "1", and ends at bit time $T_{12}$ with the sign extension.

The last partial product selector 45 is the stage to which the last or sign bit of the multiplier is coupled. The selector is similar to the prior selectors in that it produces a partial product consisting of a sequence of four zeros, the multiplicand (if the last multiplier bit is a "1"), and the sign bit repeated once.

The output of each partial product selector 41 through 45 is applied to the summation means 46 to form the final product (C). As indicated, the output of each selector 41 through 44 is coupled to an additive input of the summation means. The last selector 45 is, however, coupled to a subtractive input of the summation means. This may take the form of a serial two's complementer in the data path. The subtraction of the last partial product PP5 is because the operands are in two's complement notation. In this notation, the last bit, the sign bit is denoted by a "1" if the sign bit is negative, and by a "0" if the sign bit is positive. The algorithm for four quadrant multiplication of numbers in two's complement notation is effected when the last (most significant) partial product is subtracted. The partial products PP1 to PP5 are then combined, typically two at a time, (PP1 + PP2), (PP3 + PP4), (PP5), in the first rank of a summation tree, with the subtotals re-summed as necessary to consolidate the bit stream into a single total.

The final 12 bit double precision product, with the sign bit repeated once, then appears in appropriate two's complement notation at the output of the summation means 46. Assuming no delay in the summation means, the final product occurs at times $T_1$ to $T_{12}$. With a three bit delay in the summation means, it occurs in the bit times $T_4$ to $T_{15}$.

Figure 5:
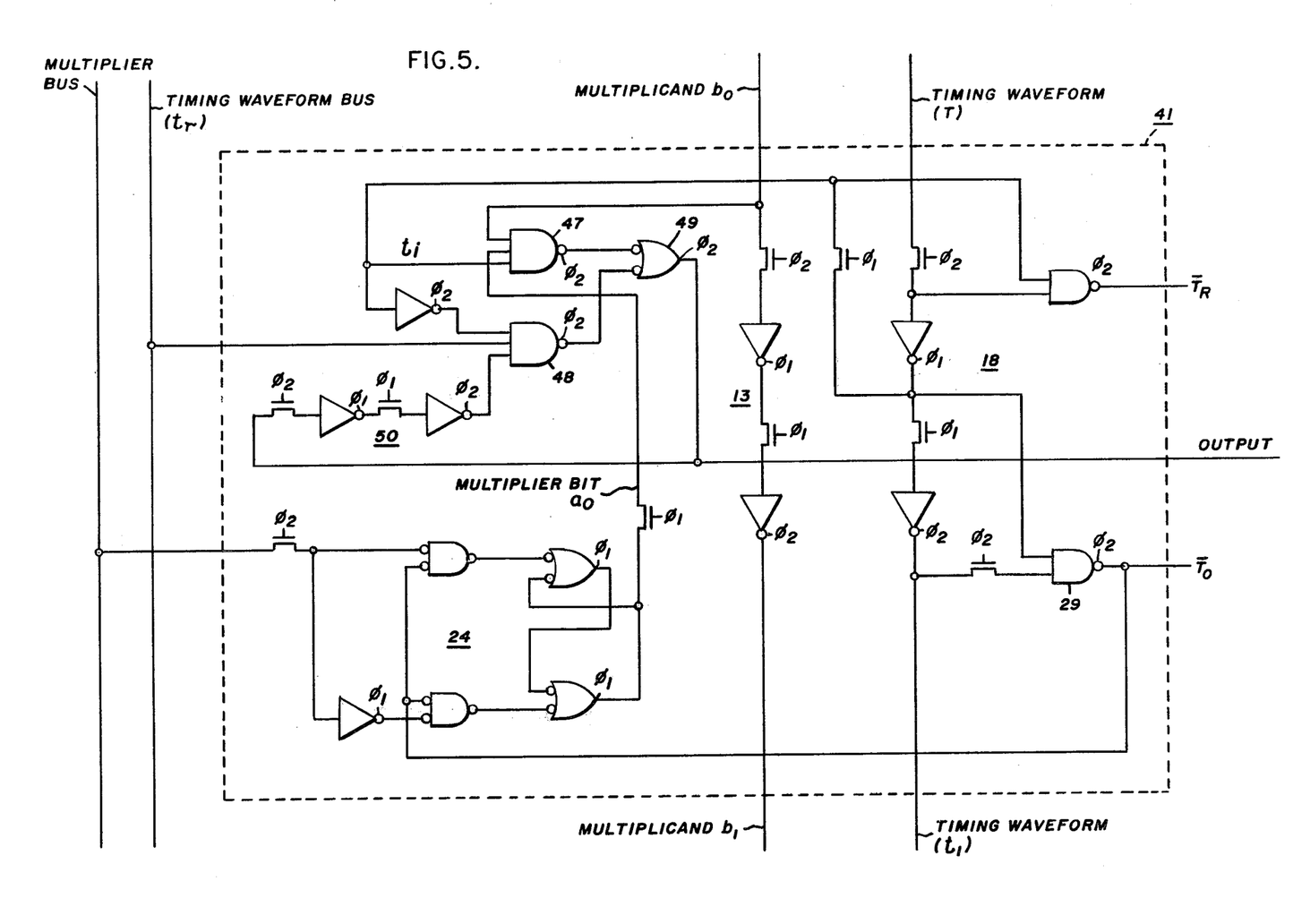
FIG. 5 is a diagram of a single partial product stage of the multiplication logic including a stage from each of the three associated registers in an integrated circuit implementation using a P-channel MOS process, in which the gates are principally minimum geometry NAND gates.

The double precision four quadrant multiplication logic may be carried out in a variety of forms but is of sufficient complexity so that integrated construction is preferred. The mode of integration may be one of several well known forms. MOSFET technology is one such form of integration in which the P-channel processes suggest a preferential use of minimum geometry NAND gates. Such an embodiment is shown in FIG. 5 which illustrates a single partial product stage or cell. The stage is constructed as a single "cell" in which the partial product selector is associated with the stages of the three registers (and AND gates) providing the multiplier bit, multiplicand and timing waveforms.

The AND gate 47, AND gate 48 and OR gate 49 previously shown in FIG. 3 are also present in FIG. 5 and bear the same reference numerals. In FIG. 5, however, the AND gates 47 and 48 are each carried out by two three input NAND gates, which produce an inverted output only when all inputs are logically true. To supply the two input inversions in gate 48 illustrated in FIG. 5, a phase inverter is provided for the delayed timing waveform. The timing waveform $t_r$ corresponds to $t_1$ inverted, and is used to halt the sign extension. The OR gate 49 is carried out by a NAND gate equated to an OR gate requiring two inverted inputs. The delay 50 is a conventional delay in FIG. 5. One stage of the multiplicand register is shown at 13 and a stage of the timing waveform register is shown at 18. The timing waveform register stage provides the bit selection signal for AND gate 29 in selection of the first multiplier bit. The multiplier bit is selected and stored by the circuit 24. In addition, outputs (e.g. $\overline{T_R}$; $\overline{T_O}$) may be taken from the timing register and ANDed to produce clearing pulses at the beginning of each word for the individual summers of the summation means.

The previously cited patent application U.S. Pat. No. 3,947,670 to John M. Irwin et al treats a single precision multiplication logic using circuits applicable to the present embodiment. In particular, the registers for the input operands and the timing waveform may be of the same form as therein shown. The summation means 46 of FIG. 3 may use individual stages of the type disclosed in the cited patent application arranged in a "tree" as taught but omitting the specific provisions for rounding correction. A two's complementer, which may be used in the output of the last partial product selector or at the output of the summation means to algebraically negate the product, may take the form shown in the cited patent application. The same two's complementer is more completely described in the U.S. Pat. No. 3,914,590 to John M. Irwin et al.

The double precision multiplication logic is flexible in respect to word length and sign capability. The arrangement is designed to work without circuit modification for multiplicands of any desired number of bits. If a multiplicand having a larger number of bits is desired, the high period of the word marker or timing waveform is increased to the number of bits of the multiplicand, leaving the low portion unchanged. The number of partial product selectors is normally set equal to the number of bits of the multiplier and the number of bits in the low portion of the word marker is set equal to the same number. In the arrangement which has just been described, subtraction is accomplished by providing a two's complementer in the path of the last partial product selector. This permits the proper handling of input operands in two's complement notation and produces a four quadrant product, also in two's complement notation. As previously noted, the full precision product has a word length equal to the sum of the bits of multiplicand and the multiplier, ending in two sign bits. The multiplication logic will also accommodate shorter multipliers. While the word length of the multiplier may not be increased beyond the number of partial product gates, it may be decreased. To operate with a shorter multiplier, the low interval of the word marker is reduced to equal the number of bits of the multiplier.

For unsigned multipliers, the highest order register stages ($a_4$, $b_4$ and $T_5$), the highest order partial product selector, and the corresponding subtractive input to the summation means are eliminated. In the illustrated embodiment, where there are five register stages and a seven bit multiplicand, the stages 16, 28 and 22 and the last subtractive input to the summation means are eliminated.

For four quadrant operation with a multiplier in sign magnitude format, a serial two's complementer is coupled after the summation means and the last multiplier bit is set equal to zero. In four-quadrant operation, to eliminate the extra sign in the product, a shortened timing waveform instead of $t_1$ may be applied to the sign extension input of the partial product selectors.

The FIG. 5 embodiment is formed in a "MOS" integration technique using P-channel technology, but may be carried out using other integrated circuit processes.

The multiplication logic may be used to advantage in many practical systems. Its double precision feature commends it to use in digital integrators permitting a feedback loop with double precision accuracy. The multiplication logic is applicable to digital filter networks, to correlation networks, to convolution, squaring and polynomial evaluation. In squaring, the same operand may be applied to the multiplier and multiplicand inputs of the logic.

While the invention has been shown with specific and practical gates in the partial product selectors, it should be evident that there are equivalent techniques which fall within the scope of the invention. While the timing waveform is shown as having a first portion which is high and a following portion which is low, it should be evident that the first portion could be low and the following portion high. Alternatively, the first portion may be coded by initial and terminal pulses to control one logic level and the second portion may be coded by initial and terminal pulses which may be used to control a second logic level, the logic levels controlling the partial product selection. Also, the gate 47 of the partial product selector may take the form of a NAND gate as shown with three inputs requiring non-inverted (positive) logic levels at each input, or alternatively a gate in which the logic levels of one or all of the inputs are inverted (or negative). Compensating changes must be made in the gate to preserve the proper network response. Similarly, the input levels of the gate 48 during the second portion of the timing waveform may be as shown, or inverted, in which event the design of the gate 48 must be modified to preserve the proper network response.

What is claimed as new and desired to be secured by Letters Patent of the United States is:

1. Apparatus for signed multiplication of two numbers to obtain a four quadrant double precision product in two's complement notation, each quantity being in serial form with the least significant bit first and accommodating a multiplier in two's complement, or unsigned notation and a multiplicand in two's complement or unsigned notation and in one of a plurality of word lengths, said apparatus comprising:
  (a) a multiplier register to which the multiplier bit stream of "n" bit words is supplied, each output tap of which selects and stores a successively later multiplier bit from each word for formation of a partial product,
  (b) a multiplicand shift register to which the multiplicand bit stream of "m" bit words is supplied having a plurality of output taps at one bit intervals,
  (c) a timing shift register in which a timing waveform is applied having a plurality of output taps at one bit intervals, said timing waveform having a first portion whose duration is set equal to "m" bit times for accommodating an "m" bit multiplicand word and having a second alternate portion set equal to the "n" bit times of a multiplier word,
  (d) a plurality of partial product selectors for forming separate partial products,
    (i) the "$i^{th}$" selector having
      (1) a first input connected to an $i^{th}$ output tap at the multiplier register for response to the "$i^{th}$" multiplier bit,
      (2) a second input connected to an output tap of said multiplicand register for entry of the $i^{th}$ multiplicand, delayed in correspondence with the significance of the multiplier bit entered,
      (3) a third input connected to an output tap on said timing register for application of a delayed timing waveform ($t_i$) having said first portion delayed to coincide with said $i^{th}$ multiplicand, and
      (4) a fourth input to which said timing waveform is applied at a predetermined delay ($t_r$) for halting sign extension and defining the bit times of the partial product word,
    (ii) said $i^{th}$ selector producing a partial product which consists of the shifted $i^{th}$ multiplicand gated by the $i^{th}$ multiplier bit preceded by zero or more zeros and succeeded by one or more extensions of the last or sign bit, and
  (e) a summation network in which all said partial products are combined, including means for negating said last partial product if a multiplier sign bit denoting a negative multiplier is entered in said last partial product selector, said summation network consolidating the bit streams representing said sign extended partial products into a sigle bit stream to form a double precision product.

2. Apparatus as set forth in claim 1 wherein said $i^{th}$ selector comprises:
  (1) first means responsive to said first three inputs for generating a shifted multiplicand during the first portion of the delayed timing waveform ($t_i$) if the multiplier bit is a "1" and a zero output under other conditions,
  (2) second means responsive to said third ($t_i$) and fourth ($t_r$) inputs and the last bit of said shifted multiplicand for repeating the last multiplicand bit if it is a "1" until said last bit time of the product, and (3) third means responsive to the outputs of said first and second means to produce a partial product of (m + n) bits duration.

3. Apparatus as set forth in claim 2 wherein said first means is a three input gate to the inputs of which said $i^{th}$ multiplier bit, said $i^{th}$ multiplicand, and the delayed timing waveform ($t_j$) are applied.

4. Apparatus as set forth in claim 3 wherein said second means is a three input gate, to the inputs of which said timing waveform at reference time ($t_r$), said delayed timing waveform ($t_j$), and said last multiplicand bit are applied.

5. Apparatus as set forth in claim 4 wherein
(1) said first means is simultaneously responsive to the three inputs thereto,
(2) said second means is simultaneously responsive to the three inputs thereto, and
(3) said third means is a two input gate responsive to one or the other inputs thereto.

6. Apparatus as set forth in claim 5 wherein a time delay is provided for coupling the bits of the shifted multiplicand from the output of said third means to the input of said second means, said second and third means being connected to regenerate the last bit of said multiplicand until said bit time limit.

7. Apparatus as set forth in claim 5 wherein
(1) said first means is a three input NAND gate,
(2) said second means comprises a three input NAND gate with signal inversion means coupled to inputs thereof, and
(3) said third means is a two input NAND gate, each of said three gates being formed by a P-channel MOS integration process.

8. Apparatus as set forth in claim 1 for two quadrant multiplication with a multiplier of variable word length, wherein
(1) the multiplicand is in two's complement notation and the multiplier is in unsigned notation, wherein
(2) a plurality of partial product selectors are provided in excess of the number of bits per multiplier word, and wherein
(3) all partial products forming a common product are additively combined in said summation network to form a product in two's complement notation.

9. Apparatus as set forth in claim 1 for four quadrant multiplication with a multiplier of variable word length, wherein
(1) the multiplicand is in two's complement notation and the multiplier is in sign magnitude notation,
(2) a plurality of partial product selectors are provided equal to the number of bits per multiplier word, the highest order multiplier bit being a zero,
(3) all partial products forming a common product are algebraically combined in said summation network to form a product in two's complement notation, and
(4) the sign bit of said multiplier is applied in said summation network to control the sign of said product.

10. Apparatus as set forth in claim 1 wherein a stage of said multiplier register, a stage of said multiplicand register, a stage of said timing register and a partial product selector are intimately associated to form a repetitive unit of similar circuit content, each stage of said three registers and said partial product selector in said repetitive unit being electrically connected to produce a single partial product for application to said summation netowrk, said repetitive unit being formed as a repetitive cellular unit in an integrated circuit process.

11. Apparatus as set forth in claim 10 wherein the integrated circuit process is a P-channel MOS process, principally utilizing minimum geometry NAND gates.

12. Apparatus as set forth in claim 1 for squaring an operand, wherein
(1) the "m" bit times of said first portion of said timing waveform is set equal to the "n" bit times of said second portion, and
(2) said operand is applied to said multiplier register and to said multiplicand register simultaneously and in consistent notation.

* * * * *